United States Patent
Rosmalen et al.

(10) Patent No.: US 12,482,680 B2
(45) Date of Patent: Nov. 25, 2025

(54) METHOD OF ALIGNING AND PLACING AN ELECTRONIC COMPONENT AND A SYSTEM FOR ALIGNING AND PLACING AN ELECTRONIC COMPONENT

(71) Applicant: NEXPERIA B.V., Nijmegen (NL)

(72) Inventors: Raymond Rosmalen, Nijmegen (NL); Erik Stens, Nijmegen (NL); Thijs Kniknie, Nijmegen (NL)

(73) Assignee: Nexperia B.V., Nijmegen (NL)

( * ) Notice: Subject to any disclaimer, the term of this patent is extended or adjusted under 35 U.S.C. 154(b) by 511 days.

(21) Appl. No.: 18/152,834

(22) Filed: Jan. 11, 2023

(65) Prior Publication Data

US 2023/0223286 A1 Jul. 13, 2023

(30) Foreign Application Priority Data

Jan. 11, 2022 (EP) .................................... 22151055

(51) Int. Cl.
*H01L 21/67* (2006.01)
*G06T 7/00* (2017.01)
*G06T 7/73* (2017.01)

(52) U.S. Cl.
CPC ........ *H01L 21/67259* (2013.01); *G06T 7/001* (2013.01); *G06T 7/74* (2017.01); *H01L 21/67132* (2013.01); *G06T 2207/20081* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 6,185,816 B1 | 2/2001 | Freund et al. | |
| 6,389,688 B1 | 5/2002 | Srivastava et al. | |
| 8,750,597 B2 | 6/2014 | Patterson et al. | |
| 10,692,747 B2 * | 6/2020 | Wagenleitner | H01L 21/67092 |
| 2010/0279439 A1 * | 11/2010 | Shah | H01L 21/67259 |
| | | | 348/95 |
| 2015/0237309 A1 | 8/2015 | Heilmann | |
| 2015/0358558 A1 | 12/2015 | McKenzie et al. | |
| 2019/0172742 A1 * | 6/2019 | Mochizuki | H01L 21/681 |
| 2022/0067958 A1 * | 3/2022 | Jimbo | G01B 11/272 |
| 2022/0181181 A1 * | 6/2022 | Shin | H01L 24/75 |
| 2023/0064941 A1 * | 3/2023 | Lee | H01L 21/6833 |
| 2024/0420976 A1 * | 12/2024 | Rohringer | H01L 21/681 |

OTHER PUBLICATIONS

Extended European Search Report for corresponding European application EP22151055.5, 5 pages dated Jul. 15, 2022.

* cited by examiner

*Primary Examiner* — Ariel Mercado-Vargas
(74) *Attorney, Agent, or Firm* — Ruggiero McAllister & McMahon LLC

(57) ABSTRACT

The present disclosure relates to a technology of manufacturing electronic components, especially semiconductor components with an irregular shape. The present disclosure provides an improved alignment method and system which may be used in cases, where features on a top surface of the semiconductor component or device are not sufficient due to process limitations and where a bottom surface might also not show any alignment correlation with the top surface.

20 Claims, 4 Drawing Sheets

METHOD OF ALIGNING AND PLACING AN ELECTRONIC COMPONENT AND A SYSTEM FOR ALIGNING AND PLACING AN ELECTRONIC COMPONENT

CROSS-REFERENCE TO RELATED APPLICATIONS

This application claims the benefit under 35 U.S.C. § 119(a) of European Application No. 22151055.5 filed Jan. 11, 2022, the contents of which are incorporated by reference herein in their entirety.

BACKGROUND

1. Field of the Disclosure

The present disclosure relates to a technology of aligning electronic components during manufacturing, especially semiconductor components with an irregular shape.

2. Description of the Related Art

When aligning electronic components in semiconductor pick-and-place applications, the bottom side alignment is normally based on outer physical edges of the component. Because of variance in the dicing process this alignment has no direct correlation with any structures present on the top surface of the component. These outer physical edges can also show a high roughness caused by the applied dicing process which has large impact on the alignment precision. In addition, the product sidewall can show significant slanted sides which varies from product to product, so that the top and bottom surfaces are not aligned.

Typically, a semiconductor pick-and-place assembly equipment aligned products based on visual structures on the surface of the semiconductor devices. When alignment was needed between top and bottom of these devices, alignment structures were required that are visible on both sides of the product. In practice this often meant aligning on the outer edge of the product, as most devices have a straight edge (parallel to the camera viewing axis).

Prior art made use of external structures for alignment, mostly the outer physical edges of a product. As these features are not always present on both sides of a semiconductor product, alignment on structures at the other side of the product than the one imaged is not always possible.

Document U.S. Pat. No. 8,750,597B2 discloses a method of performing inspection alignment point selection for semiconductor devices includes importing, with a computer device, one or more semiconductor design files corresponding to an area of a semiconductor die; aligning a design taken from the one or more semiconductor design files with an image taken from a die of a semiconductor wafer; and selecting an alignment point and recording a portion of the design file corresponding to the alignment point as a master reference image.

Document U.S. Pat. No. 6,185,816B1 discloses a system for handling semiconductor workpieces, by aligning a movable pick and place device and a movable optical control device, is disclosed. The system and method provide for the formation of an imprint by the pick and place device. The optical control device can then be aligned to that imprint, creating alignment between the pick and place device and the optical control device. Once alignment is complete the imprinted material may be replaced with one or more semiconductor workpieces.

SUMMARY

It is a goal of the present disclosure to provide an improved alignment method which may be used in cases, where features on a top surface of the semiconductor component or device are not sufficient due to process limitations and where a bottom surface might also not show any alignment correlation with the top surface.

According to a first example of the disclosure, a method of aligning and placing an electronic component is proposed, with the electronic component having a first, top surface side and a second, bottom surface side opposite to the first surface side. The method comprises steps of illuminating, using a light source unit, the electronic component with light which transmits through the electronic component, such that at least one feature of the electronic component visible from the first surface side and at least one feature visible from the second surface side; obtaining, using a first camera unit, an image of the electronic component containing image data of the at least one feature present visible from the first surface side and at least one feature visible from the second surface side; calculating, based on the image data, of a correction value wherein the correction value is indicative of a position of the second surface side of the electronic component with respect to the first surface side of the electronic component; transferring the electronic component to an assembling station; calculating of a position of an adjusted placing area of the electronic component by adjusting a placing area, which is an area within the assembling station where the second side of the electronic component must by placed, with the correction value; placing the semiconductor component, using a second camera unit, by obtaining an image containing image data of the first surface side of the electronic component and an assembly device structured to place the electronic component, such that the first surface side of the electronic component is located within the adjusted designated area.

Preferably the light source unit emits light in the infrared or in the visible wavelength spectrum.

Preferably in step a. and b. the electronic component is positioned between the light source unit and the first camera unit.

Preferably in step a. and b. the light source unit and the first camera unit are pointing towards the same direction.

Preferably in step c a template matching algorithm or one or more machine learning algorithms is used.

Preferably an axis of the first camera unit and/or the second camera unit is perpendicular to the first surface side and/or the second surface side of the electronic component.

In an non-limiting example, the electronic component is placed on an integrated circuit substrate. Alternatively, a transfer substrate can be used in particular in LED applications.

Furthermore, in a non-limiting example, the electronic component is a sapphire component. However, any other type of semiconductor component can be used, such as a silicon semiconductor component. Both examples can be used for visible and near infrared light sources.

According to a further example of the disclosure a system for aligning and placing an electronic component is disclosed. The system comprising a light source unit, a first camera unit configured to obtain an image of an electronic component in a first measuring position, the electronic component having a first, top surface side and a second, bottom surface side opposite to the first surface side, the image containing image data of the at least one feature visible from the first surface side and at least one electronic feature visible from the second surface side, a second camera unit configured to obtain an image of the first surface side of the electronic component in a second measuring position, a transportation unit configured to transport the electronic component from the first measuring position to the second measuring position, a processing system configured to calculate, based on the image data, of a correction value wherein the correction value is indicative a position of the second surface side of the electronic component with respect to the first surface side of the electronic component, and to calculate of position of an adjusted placing area of the electronic component by adjusting a placing area, which is an area within the second measuring position where the second side of the electronic component must by placed, with the correction value.

It should be noted, that the measuring of the second measuring position can be performed either before or after the placement of the electronic component on the substrate, That is either while the electronic component is still held by the transportation unit or when the electronic component is already placed on the substrate. Both situations may depend on the alignment requirements of the specific application.

In the first situation, the electronics side of the electronic product can be inspected prior to the placement on the substrate, whilst the electronic component is being held by the transportation unit. Accordingly, with the second measuring position and the correction value thus obtained prior to placement, proper alignment of the electronic product on the substrate can be achieved.

In the second situation, the placement of the electronic product on the substrate may need validation after the placement. Accordingly, a correction value is associated with the (non-aligning) features on the top side in order to determine the actual placement position of the electronics on the other side of the electronic product relative to the substrate.

Preferably the system also comprising a measuring unit configured to hold the electronic component in the first measuring position.

Preferably the system also comprising a holding unit configured to hold the electronic component in the second measuring position.

Preferably the system also comprising an assembly device configured to place the electronic component on the placing area.

Preferably the light source emits an infrared light or a visible light.

Preferably the measuring unit is configured to hold the electronic component between the light source unit and the first camera unit.

Preferably the light source unit and the first camera unit are pointing toward the same direction.

Preferably an axis of the first camera unit and/or the second camera unit is perpendicular to the first surface side and/or the second surface side of the electronic component.

BRIEF DESCRIPTION OF DRAWINGS

The disclosure will now be discussed with reference to the drawings, which show in.

DETAILED DESCRIPTION

Figure 1:
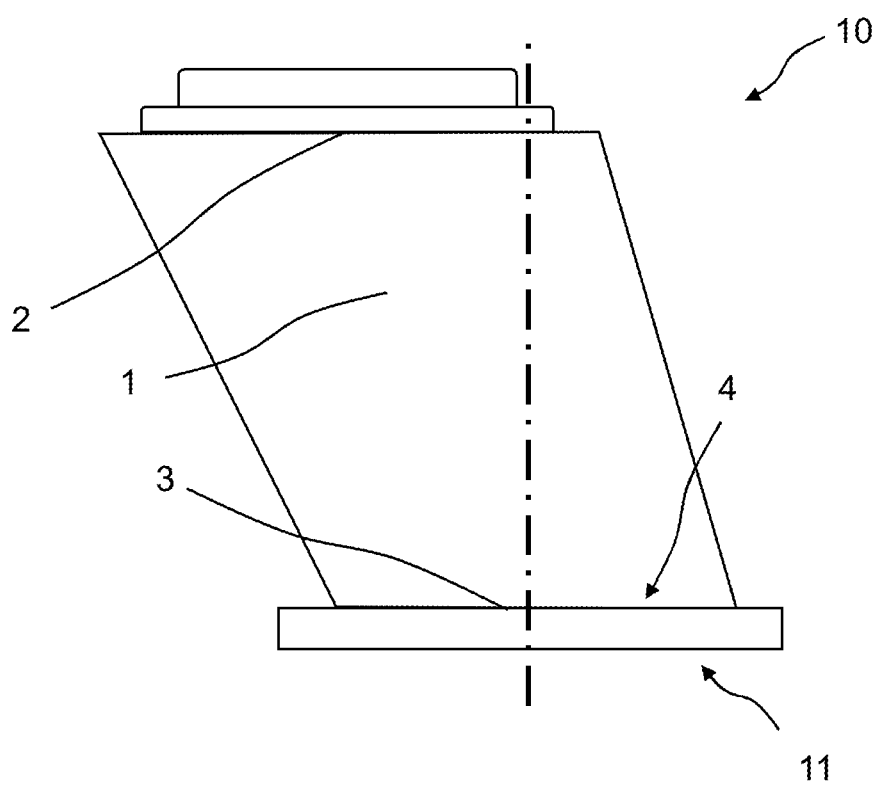
FIG. 1 an example of a mini-LED device in particular a schematic view of the sapphire part of a mini-LED device aligned with a substrate pad.

For a proper understanding of the disclosure, in the detailed description below corresponding elements or parts of the disclosure will be denoted with identical reference numerals in the drawings.

FIG. 1 shows an example of a mini-LED device 10. The product's first (top) surface side 2 contains pads that need to be aligned with the substrate pad 11 when placed. However, the second (bottom) surface side 3 of the product 10 is 'obscured' with a piece of sapphire 1, which is different on the top surface side 2 and on the bottom surface side 3 due to its slanted nature. Alignment of the pads on the top surface side 2 by measuring the bottom surface 3 side is therefore not possible.

Figure 2:
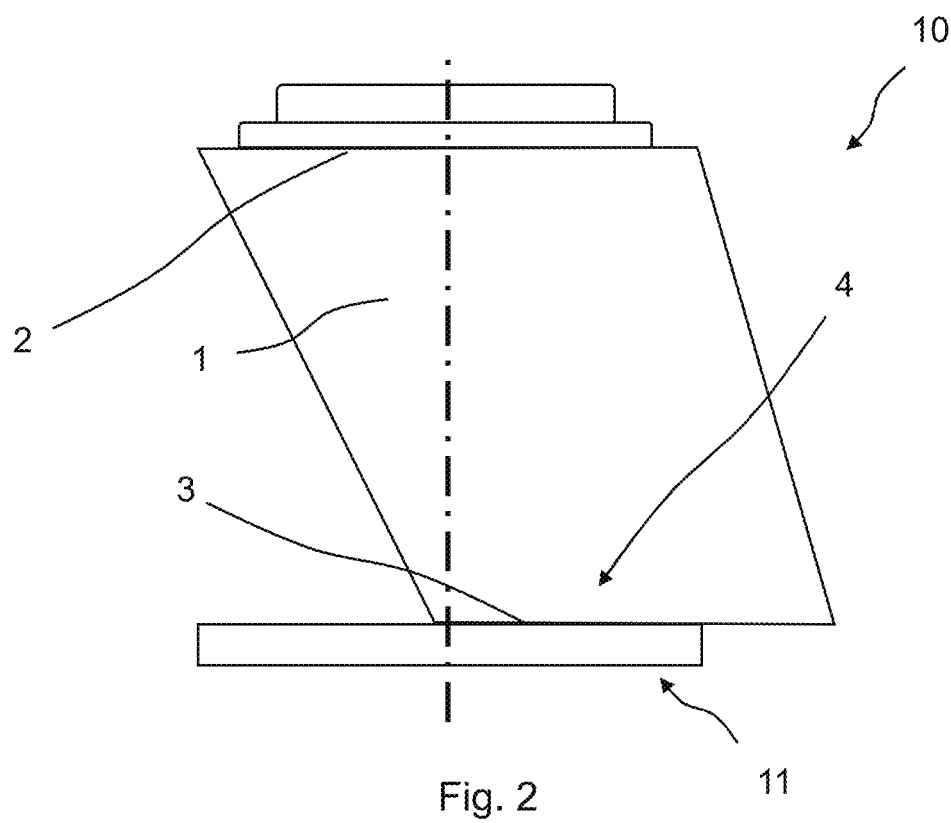
FIG. 2 a schematic view of the electronics part of a mini-LED device aligned with a substrate pad.

In particular, but in a non-limiting example, FIG. 1 shows a schematic view of a sapphire 1 aligned with a substrate pad 11 (or the placing area 4). It may be seen that a top surface side 2 is not directly over the substrate pad 11. The alignment situation in which the top surface side 2 is directly over the substrate pad 11 is shown in FIG. 2, but in this case a bottom surface side 3 is not aligned with the substrate pad 11 on the placing area 4 thus resulting in an incorrect assembly. Alternatively, any other type of semiconductor component 10 can be used, preferably a silicon semiconductor component. Both examples can be used for visible and near infrared light sources The electronic component 10 can be placed on an integrated circuit substrate 11. Alternatively, a transfer substrate 11 can be used in particular in LED applications. The disclosure presents a method to provide a correct assembly while position an electronic component 10 while assembling is performed while only a top, first surface side 2 of the electronic component is visible.

A method is performed on an electronic component 10 having a first, top surface side 2 and a second, bottom surface side 3 opposite to the first surface side 2. In a first step, step a, the electronic component 10 is illuminated, by means of a light source unit, with light which transmits through the electronic component 10, such that at least one feature of the electronic component 10 visible from the first surface side 2 and at least one feature 5 visible from the second surface side 3.

In a second step, step b, an image of the electronic component 10 is obtained with a first camera unit. The image contains image data of the at least one feature present 5 visible from the first surface side 2 and at least one feature 5 visible from the second surface side 3.

During a third step, step c, a correction value is calculated. This calculations are based on the image data from the image taken in the second step. The correction value is indicative of a position of the second surface side 3 of the electronic component 1 with respect to the first surface side 2 of the electronic component 10. In other word the correction value is an offset, which informs how misaligned a first, top side 2 of the electronic component 10 has to be so that the second, bottom side 3 is placed in a designated place 4.

In a fourth step, step d, the electronic component 10 is transferred to an assembling station. It should be noted that it is possible to perform all steps in one station which is able to take pictures, calculate and assembly. In such case the fourth step take place before a final assembly.

During a next step, step e, a position of an adjusted placing area 4 of the electronic component 10 is calculated. It is done by adjusting a placing area 4, which is an area within the assembling station where the second side 3 of the electronic component 10 must by placed, with the correction value. This step may also be performed step d.

In a final step, step f, the electronic component 10 is placed in the designated place 4. A second camera unit is used to keep track of the first, top surface side 2. By obtaining an image containing image data of the first surface side 2 of the electronic component 10 and an assembly device structured to place the electronic component 1, such that the first surface side 2 of the electronic component 10 is located within the adjusted designated area.

The position information obtained from the image is directly correlated with the top side of the product.

Alignment is performed based on internal structures 5 of a semiconductor product, instead of external (surface) structures. This is particularly useful for mini-LED and micro-LED product alignment, because of the extreme rough surface edges and the significant slanted sidewall edges which cannot be used for robust alignment.

Figure 3:
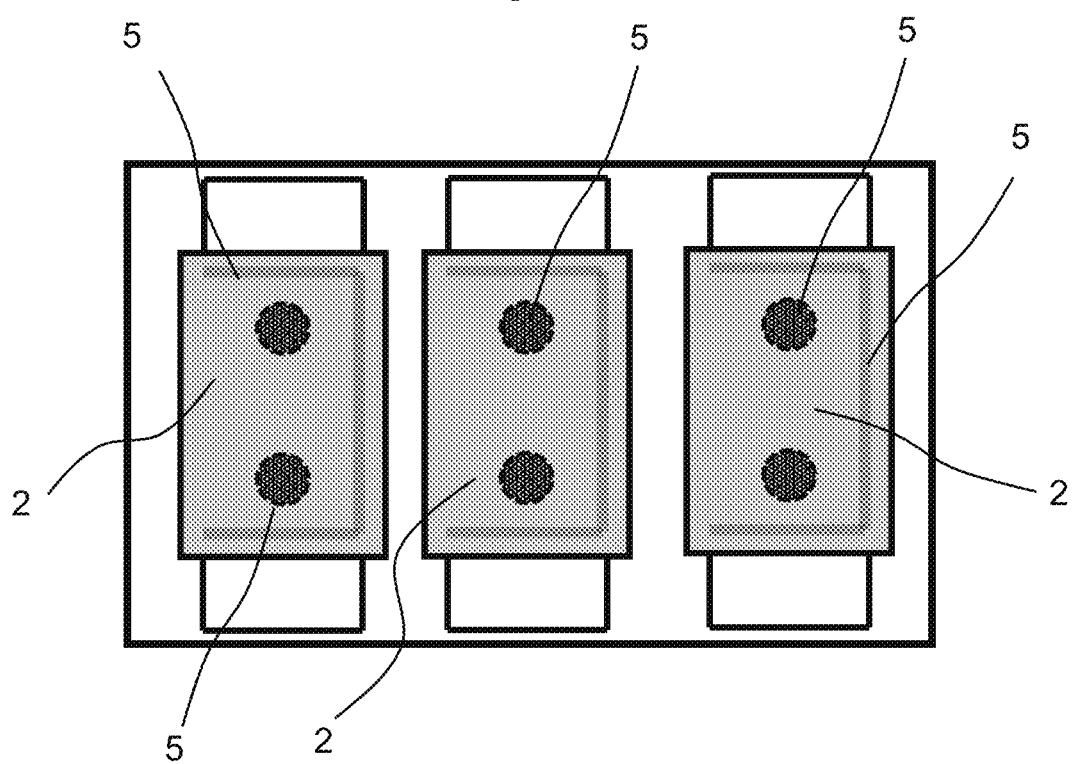
FIG. 3 three mini-LED products imaged through a sapphire top layer.
Figure 4:
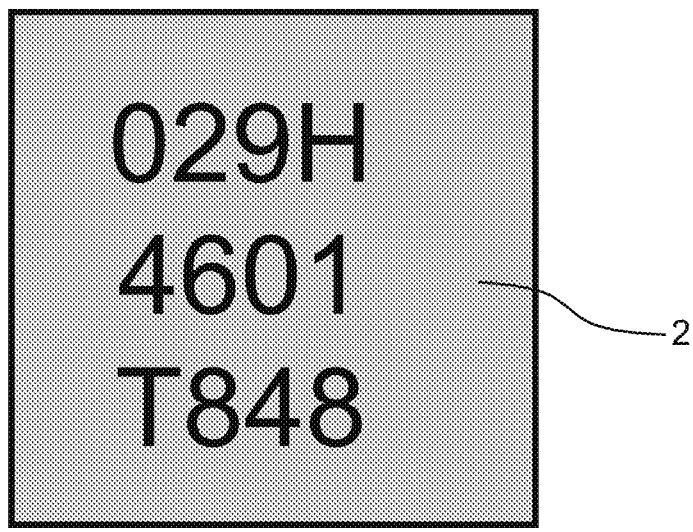
FIG. 4 a product image captured from the backside with visible light.
Figure 5:
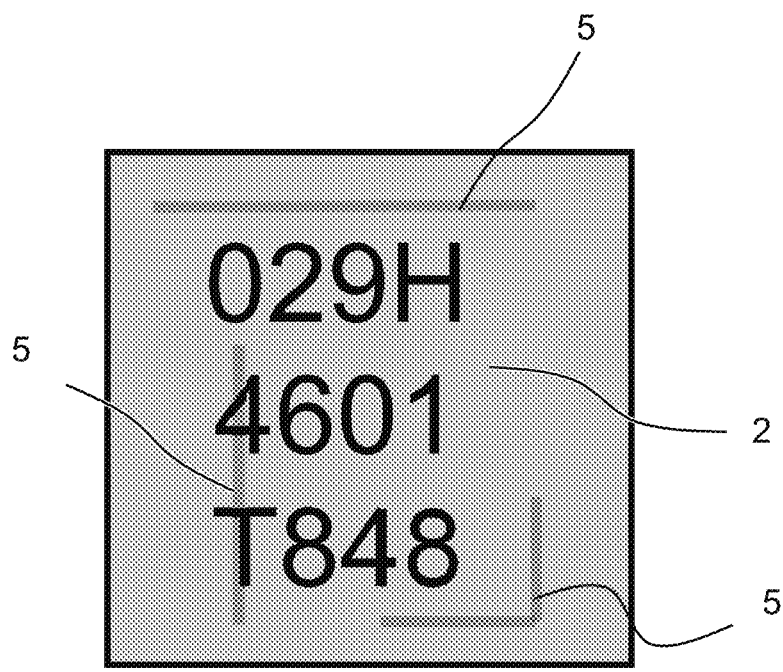
FIG. 5 a product image captured from the backside with infrared light.

In one example the light source unit emits light in the infrared or in the visible wavelength spectrum. FIG. 3 shows three mini-LED products imaged through a sapphire top layer. Sapphire has a high transmission for visible light, so illuminating and imaging the product in visible light, in this case blue light with a wavelength of 457 nm, produced the highest contrast between the pads of the device and the rest of the image. FIG. 4 shows a product image captured from the backside with visible light. Notice that no structures other than the rough outside edge of the product containing a serial number of the electronic component are visible here. FIG. 5 shows the same product as in FIG. 4, now captured using near-infrared illumination. The internal features 5 become detectable and can be used for product alignment.

In another example, in step a. and b. the electronic component 10 is positioned between the light source unit and the first camera unit. The first camera unit is capturing light which passed through the electronic component 10. In another example, in step a. and b. the light source unit and the first camera unit are pointing towards the same direction. In this case the first camera unit is receiving a light which has been reflected from features of at least one feature 5 visible from the second surface side 3. A vision system is used consisting of a camera, optics and an illumination unit with a specific wavelength for which the obscuring part of the semiconductor product is highly transmissive, while at the same time reflective on the internal (metal) structures. This will make the internal structures visible in the captured image and available for alignment on a substrate.

Preferably, in step c, the position can be found via template matching, in which a reference image of the expected feature is defined as template and matched on every runtime captured image. The internal structures which are used as features to align on are typically low contrast and are only partly visible. To optimize alignment robustness a more advanced alignment technique based on a neural network can be used which is less sensitive for low contrast and occlusion of varying parts defined in a template reference.

In a further example an axis of the first camera unit and/or the second camera unit is perpendicular to the first surface side 2 and/or the second surface side 3 of the electronic component 10. In this case a plane of the first surface side 2 is perpendicular to the axis of the first camera unit and thus results in fewer image processing operation needed.

Preferably this method may be used to place the electronic component 10 on an integrated circuit substrate.

As stated hereinbefore the electronic component 10 may be a sapphire component 1. The electronic component 10 may also be any other type of semiconductor component, preferably a silicon semiconductor component. Alternatively, a transfer substrate 11 can be used in particular in LED applications. Both examples can be used for visible and near infrared light sources.

Figure 6:
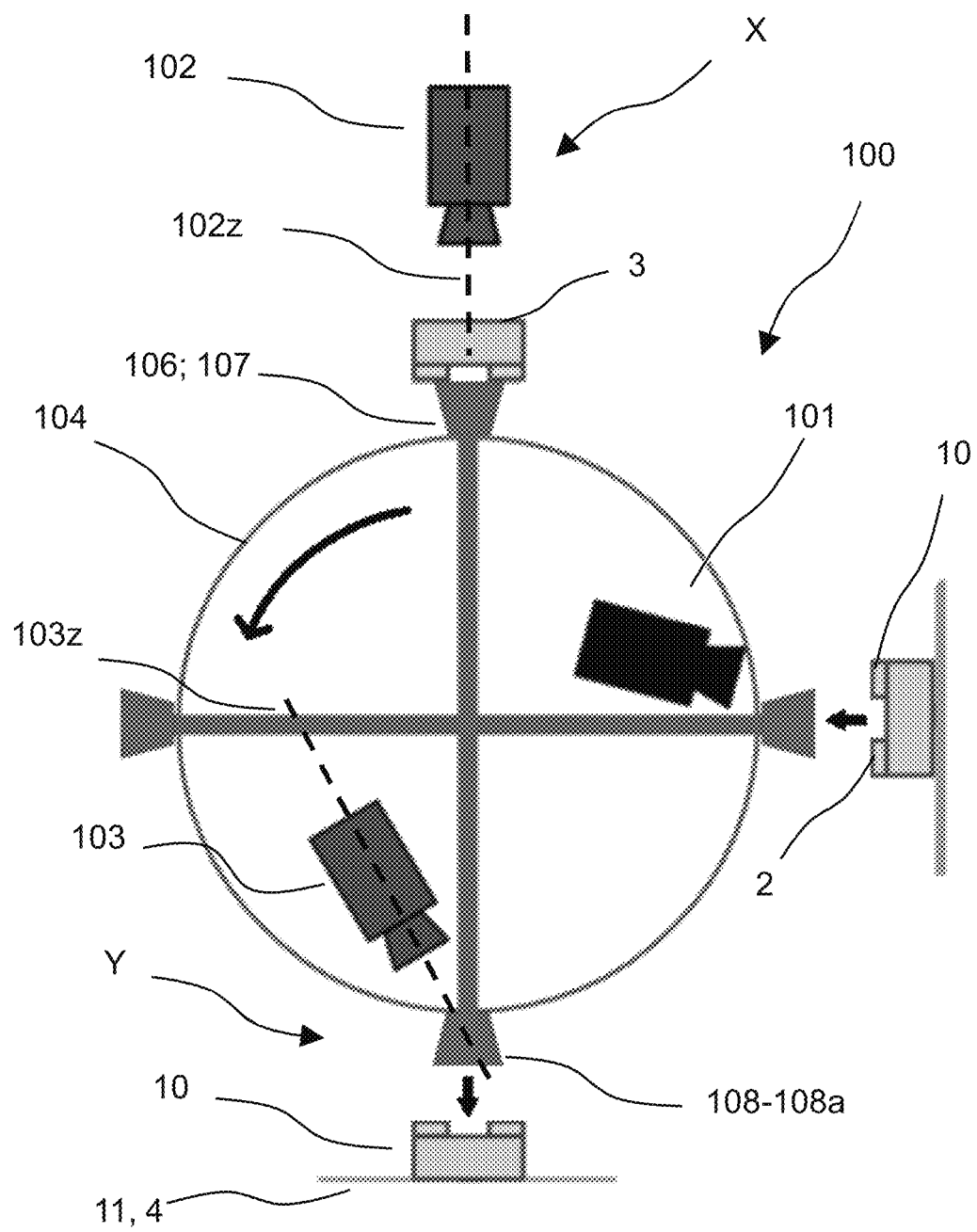
FIG. 6 a system for aligning and placing an electronic component.

Also a system for aligning and placing an electronic component is disclosed in FIG. 6. The system 100 comprising a light source unit 101, a first camera unit 102, a second camera unit 103, a transportation unit 104, and a processing system (not shown). The first camera unit 102 is configured to obtain an image of the second surface side 3 of the electronic component 10 in a first measuring position X. The second camera unit 103 is configured to obtain an image of the first surface side 2 of the electronic component 10 in a second measuring position Y. The transportation unit 104 is configured to transport the electronic component 10 from the first measuring position X to the second measuring position Y. The processing system is configured to calculate, based on the image data, of a correction value wherein the correction value is indicative a position of the second surface side 3 of the electronic component 10 with respect to the first surface side 2 of the electronic component 10, and to calculate of position of an adjusted placing area of the electronic component 10 by adjusting a placing area 4, which is an area within the second measuring position Y where the second surface side 3 of the electronic component 10 must by placed on the designated place 4, with the correction value.

In an example of the system 100 the measuring of the first measuring position (for performing steps a, b) and the second measuring position (for performing step f) may take place in one space (for example in one device) which space (device) is configured to perform all tasks in one place.

In one example the system 100 may also comprise a measuring unit 106 configured to hold the electronic component 10 in the first measuring position X.

In another example the system 100 also comprises a holding unit 107 configured to hold the electronic component 10 in the second measuring position Y.

In yet another example the system 100 comprises an assembly device 108 configured to place the electronic component 10 on the placing area 4. The assembly device 108 may be, for example, a robotic arm 108a.

It should be noted, that the light source unit 102 emits an infrared light or a visible light. A type of the light depends on properties of a particular electronic device 10 to be placed.

In another example, the measuring unit 106 is configured to hold the electronic component 10 between the light source unit 102 and the first camera unit 103. The first camera unit 102 is capturing light which passed through the electronic component 10. In another example the light source unit 102 and the first camera unit 103 are pointing towards the same direction. In this case the first camera unit 102 is receiving a light which has been reflected from features of at least one feature 5 visible from the second surface side 3.

In one example an axis 102z of the first camera unit 102 and/or an axis 103z of the second camera unit 103 is perpendicular to the first surface side 2 and/or the second surface side 3 of the electronic component 10.

The measuring of the second measuring position can be performed either before or after the placement of the electronic component 10 on the substrate in the placing area 4, According, the second measuring position can be determined either while the electronic component 10 is still held by the transportation unit 104 or when the electronic component 10 is already placed on the substrate. At stated previously. both situations may depend on the alignment requirements of the specific application. First, the electronics side 2 of the electronic product 10 can be inspected prior to the placement on the substrate, whilst the electronic component is being held by the transportation unit 104. Accordingly, with the second measuring position Y and the correction value thus obtained prior to placement, proper alignment of the electronic product 10 with its second surface side 3 on the substrate on the placing area 4 can be achieved.

In the second situation, the placement of the electronic product 10 on the substrate in the placing area 4 may need validation after the placement. Accordingly, a correction value is associated with the (non-aligning) features on the top side 2 in order to determine the actual placement position of the electronics on the other side of the electronic product relative to the substrate 11.

LIST OF REFERENCE NUMERALS USED

1 sapphire body
2 first surface
3 second surface
4 placing area
5 feature of the second surface
10 electronic component
11 substrate
100 system
101 light source unit
102 first camera unit
102z axis of first camera unit
103 second camera unit
103z axis of second camera unit
104 transportation unit
105 processing system
106 measuring unit
107 holding unit
108 assembly device
108a robotic arm

What is claimed is:

1. A method of aligning and placing an electronic component, the electronic component having a first, top surface side and a second, bottom surface side opposite to the first surface side, the method comprising steps of
    a. illuminating, using a light source unit, the electronic component with light which transmits through the electronic component, so that at least one feature of the electronic component is visible from the first surface side and at least one feature is visible from the second surface side;
    b. obtaining, using a first camera unit, an image of the electronic component containing image data of the at least one feature present visible from the first surface side and at least one feature visible from the second surface side;
    c. calculating, based on the image data, of a correction value wherein the correction value is indicative of a position of the second surface side of the electronic component with respect to the first surface side of the electronic component;
    d. transferring the electronic component to an assembling station;
    e. calculating of a position of an adjusted placing area of the electronic component by adjusting a placing area, which is an area in the assembling station where the second side of the electronic component must by placed, with the correction value;
    f. placing the electronic component, using a second camera unit, by obtaining an image containing image data of the first surface side of the electronic component and an assembly device structured to place the electronic component, so that the first surface side of the electronic component is located in the adjusted designated area.

2. The method according to claim 1, wherein the light source unit emits light in the infrared or in the visible wavelength spectrum.

3. The method according to claim 2, wherein in step a, and step b, the electronic component is positioned between the light source unit and the first camera unit.

4. The method according to claim 2, wherein in step a, and step b, the light source unit and the first camera unit are pointing towards the same direction.

5. The method according to claim 2, wherein in step c a temple matching algorithm or one or more machine learning algorithms is used.

6. The method according to claim 2, wherein the first camera unit and/or the second camera unit has an axis that is perpendicular to the first surface side and/or the second surface side of the electronic component.

7. The method according to claim 2, wherein the electronic component is placed on an integrated circuit substrate.

8. The method according to claim 1, wherein in step a, and step b, the electronic component is positioned between the light source unit and the first camera unit.

9. The method according to claim 1, wherein in step a, and step b, the light source unit and the first camera unit are pointing towards the same direction.

10. The method according to claim 1, wherein in step c a temple matching algorithm or one or more machine learning algorithms is used.

11. The method according to claim 1, wherein the first camera unit and/or the second camera unit has an axis that is perpendicular to the first surface side and/or the second surface side of the electronic component.

12. The method according to claim 1, wherein the electronic component is placed on an integrated circuit substrate.

13. The method according to claim 1, wherein the electronic component is a sapphire component or any other type of semiconductor component.

14. A system for aligning and placing an electronic component comprising:
    a light source unit;
    a first camera unit configured to obtain an image of an electronic component in a first measuring position, the electronic component having a first, top surface side and a second, bottom surface side opposite to the first surface side, the image containing image data of the at least one feature visible from the first surface side and at least one feature visible from the second surface side;
    a second camera unit configured to obtain an image of the first surface side of the electronic component in a second measuring position;
    a transportation unit configured to transport the electronic component from the first measuring position to the second measuring position;

a processing system configured to calculate, based on the image data, of a correction value, wherein the correction value is indicative a position of the second surface side of the electronic component with respect to the first surface side of the electronic component, and to calculate the position of an adjusted placing area of the electronic component by adjusting a placing area, which is an area within the second measuring position where the second side of the electronic component must by placed, with the correction value.

15. The system according to claim 14, further comprising a measuring unit configured to hold the electronic component in the first measuring position.

16. The system according to claim 14, further comprising a holding unit configured to hold the electronic component in the second measuring position.

17. The system according to claim 14, further comprising an assembly device configured to place the electronic component on the placing area.

18. The system according to claim 14, wherein the measuring unit is configured to hold the electronic component between the light source unit and the first camera unit.

19. The system according to claim 14, wherein the light source unit and the first camera unit are pointing toward a same direction.

20. The system according to claim 14, wherein the first camera unit and/or the second camera unit has an axis that is perpendicular to the first surface side and/or the second surface side of the electronic component.

* * * * *